United States Patent [19]

Draffen

[11] Patent Number: 5,148,490
[45] Date of Patent: Sep. 15, 1992

[54] SPEAKER WITH TWEETER ASSEMBLY MOUNTED TO THE INTERIOR OF THE WINDSHIELD OF A VEHICLE

[75] Inventor: Gary T. Draffen, Rancho Palos Verdes, Calif.

[73] Assignee: Culver Electronic Sales, Inc., Gardena, Calif.

[21] Appl. No.: 590,782

[22] Filed: Oct. 1, 1990

[51] Int. Cl.$^5$ .............................................. H04B 1/00
[52] U.S. Cl. ....................................... 381/86; 381/24; 381/90; 381/188; 381/205
[58] Field of Search ................... 381/24, 86, 188, 205, 381/88, 90; 359/864, 850, 851, 871, 863, 606

[56] References Cited

U.S. PATENT DOCUMENTS

| | | | |
|---|---|---|---|
| 4,575,202 | 3/1986 | McGuire | 359/864 |
| 4,768,870 | 9/1988 | Chen | 381/86 |
| 4,811,406 | 3/1989 | Kawachi | 381/188 |

Primary Examiner—Jin F. Ng
Assistant Examiner—Nina Tong
Attorney, Agent, or Firm—Thomas I. Rozsa

[57] ABSTRACT

An improved stereo speaker system wherein the tweeter is movably and rotatably mounted on the interior of the vehicle's windshield so that the direction of the sound emanating from the tweeter can be adjusted to the preference of the listener. The tweeter is mounted in a shell which may cause the tweeter to remain fixed in the shell or alternatively permit the tweeter to be rotated within the shell. The shell in turn is mounted on the windshield of the vehicle. The shell may be mounted in a fixed orientation if the tweeter is rotatable within the shell. Alternatively, the shell may be mounted on a post with a rotatable bearing, comparable to the mounting of the rear view mirror in present day vehicles, so that the shell itself can be rotatable to orient the sound emanating from the tweeter in any desired direction. The tweeter itself may be rotatable within the shell to provide further refined directional orientation of the sound.

19 Claims, 1 Drawing Sheet

SPEAKER WITH TWEETER ASSEMBLY MOUNTED TO THE INTERIOR OF THE WINDSHIELD OF A VEHICLE

BACKGROUND OF THE INVENTION

1. Field of the Invention

The present invention relates to the field of stereo speaker systems for use in vehicles such as automobiles, trucks, vans, etc. In particular, the present invention relates to an improved stereo speaker system which facilitates ease of installation in the vehicle and which further provides a system wherein the stereo assembly can be installed without defacing or altering the interior of the vehicle.

2. Description of the Prior Art

Stereo speakers systems have been installed in vehicles for many years. The stereo speaker system comprises two primary components. The first component is a tweeter which is a small loudspeaker responsive only to the high acoustic frequencies and reproducing sounds of high pitch. The second component is a woofer which is a loudspeaker, usually larger than a tweeter, responsive only to the lower acoustic frequencies, and used for reproducing sounds of low pitch.

In prior art installations, the stereo system is either installed in the factory or subsequently installed in the vehicle after it is purchased. In either case, it is necessary to cut into the upholstery of the vehicle to provide openings for the woofer and the tweeter. The openings are usually in the dashboard of the vehicle, the flat rear panel adjacent the rear window of the vehicle, and in the upholstery of the door and/or sides of the vehicle. This is usually not a problem when the stereo system is installed in the factory. However, it presents a more significant problem when the stereo system is later installed after manufacture of the vehicle has been completed. It is very difficult for the owner to self install such a system and it usually requires a specialist to install the speaker system in the vehicle. The requirement for cutting openings in the interior of the vehicle also presents a cosmetic problem since the surface of the interior may be marred.

There is a significant need for an improved easy to install stereo speaker system which reduces the effort involved in installing a speaker system and which eliminates the problem of cutting into the interior portions of the vehicle to install the speaker system.

SUMMARY OF THE PRESENT INVENTION

The present invention relates to an improved stereo speaker system wherein the tweeter is movably and rotatably mounted on the interior of the vehicle's windshield so that the direction of the sound emanating from the tweeter can be adjusted to the preference of the listener. The tweeter is mounted in a shell which may cause the tweeter to remain fixed in the shell or alternatively permit the tweeter to be rotated within the shell. The shell in turn is mounted on the windshield of the vehicle. The shell may be mounted in a fixed orientation if the tweeter is rotatable within the shell. Alternatively, the shell may be mounted on a post with a rotatable bearing, comparable to the mounting of the rear view mirror in present day vehicles, so that the shell itself can be rotatable to orient the sound emanating from the tweeter in any desired direction. The tweeter itself may be rotatable within the shell to provide further refined directional orientation of the sound.

It has been discovered, according to the present invention, that the direction of the sound of the woofer is not a critical element in vehicle audio sound listening and the woofer can be mounted at any desired location within the vehicle. However, it has further been discovered, according to the present invention, that the location of the tweeter is very important because the direction of the sound emanating from the tweeter significantly affects the quality of the sound. Therefore, the tweeter must be mounted at a location in the vehicle where the sound can be directly transmitted from the tweeter to the listener.

It has therefore been discovered, according to the present invention, that if the tweeter is mounted on the windshield of a vehicle, then the sound emanating from the tweeter can be properly oriented for appropriate listening.

It has further been discovered, according to the present invention, that if the tweeter is movably and rotatably mounted on the windshield, then the sound emanating from the tweeter can be specifically adjusted to any desired orientation.

It has additionally been discovered, according to the present invention, that the enclosure for the tweeter can best be mounted on the windshield of the vehicle if the location of the mounting is adjacent the dashboard since the portion of the windshield at this location is generally flat. In addition, the mounting location adjacent the dashboard facilitates ease of wiring the tweeter to the stereo components which can be housed beneath the dashboard with only a small amount of wiring exposed to view.

It is therefore an object of the present invention to provide a specialized mounting for a tweeter of a speaker assembly which enables the tweeter to be mounted on the interior of the windshield of a vehicle and which further permits the direction of the sound emanating from the tweeter to be adjusted to any desired orientation.

It is a further object of the present invention to provide a speaker assembly wherein the tweeter is easy to install so that the vehicle owner can install the tweeter without having to cut open any portion of the interior of the vehicle.

It is an additional object of the present invention to provide a speaker assembly wherein the direction of the sound emanating from the tweeter can be easily adjusted by hand.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
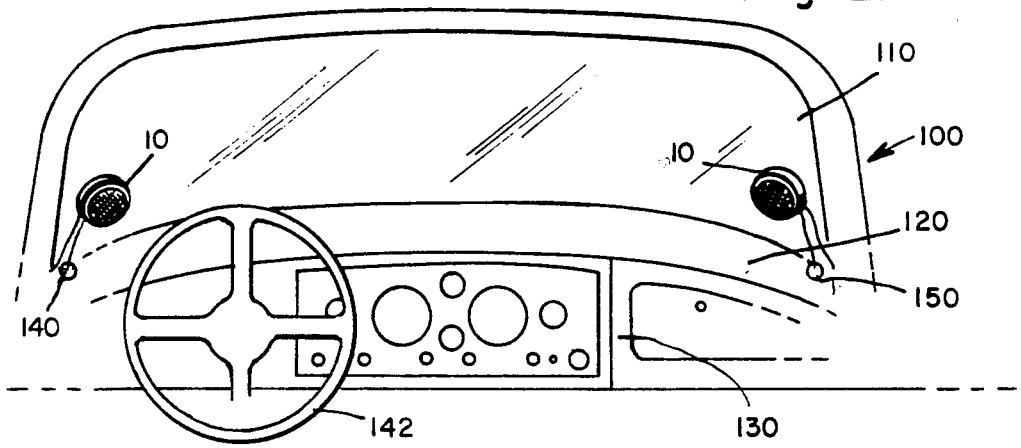
FIG. 1 is a perspective view of the dashboard and windshield of a vehicle with the present invention speaker with tweeter assembly mounted to the interior of the windshield of a vehicle installed on the interior of the windshield at two remote locations, each adjacent the dashboard of the vehicle.

Referring to FIG. 1, there is illustrated at 100 a vehicle which by way of example can be an automobile. The vehicle 100 includes a windshield 110, a dashboard 120, an instrument panel 130, and a steering wheel 142, all of well known configuration. The present invention speaker with tweeter assembly 10 mounted to the interior of the windshield is illustrated mounted at two spaced apart locations on the windshield 110. As illustrated in FIG. 1, in the preferred embodiment, the tweeter assembly 10 is positioned on the windshield 110 at a location adjacent the dashboard 120 because the windshield 110 is generally flat at the location adjacent the dashboard 120 and therefore affords a better surface on which to mount the tweeter assembly.

Figure 2:
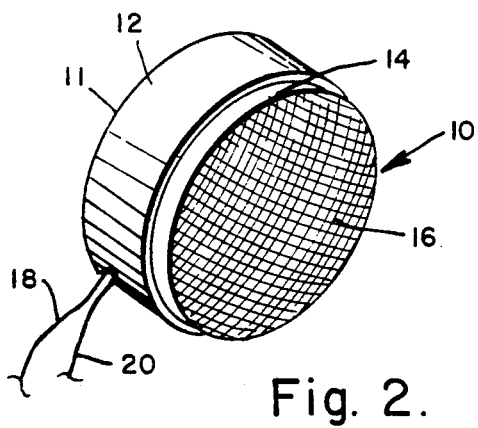
FIG. 2 is a perspective view of the tweeter set within a shell, in accordance with the present invention.

One embodiment of the tweeter assembly 10 is illustrated in FIG. 2. The tweeter assembly 10 comprises a shell support member 12 which supports the tweeter 14. The exterior surface of the tweeter 14 comprises a grill 16. In one embodiment as illustrated in FIG. 2, the tweeter 14 and its grill 16 are fixed within shell support member 12 and therefore the direction of the sound emanating from the tweeter 14 through grill 16 cannot be adjusted relative to the shell support member 12. Extending out of shell support member 12 are the wires 18 and 20 which connect the tweeter to the operating stereo components which by way of example can be located beneath the dashboard 120 and behind the instrument panel 130. By locating the tweeter assembly 10 on the windshield 110 at a location adjacent the dashboard 120, the wires 18 and 20 will either not be exposed to view or only a very small portion of the wires 18 and 20 will be exposed to view, as illustrated in FIG. 1.

Figure 4:
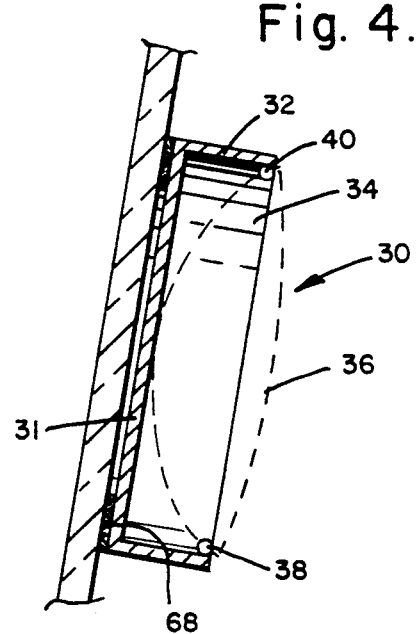
FIG. 4 is a side view in partial cross-section of an alternative embodiment of the present invention, with the shell containing the tweeter directly mounted to the interior of the windshield of a vehicle.
Figure 3:
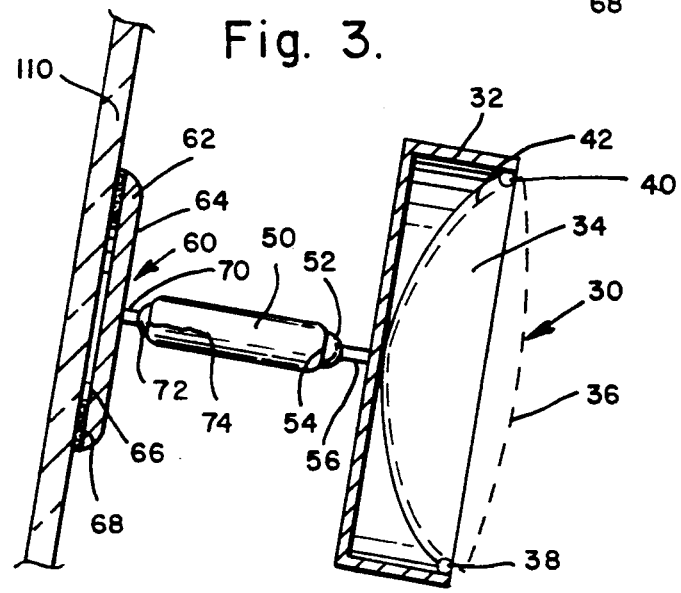
FIG. 3 is a side view in partial cross-section of the preferred embodiment of the present invention, with the shell containing the tweeter movably and rotatably mounted to a post which in turn is movably and rotatably mounted to the interior of the windshield of a vehicle.

An alternative embodiment for the tweeter assembly 30 is illustrated in FIGS. 3 and 4. The tweeter assembly 30 comprises a shell support member 32 which supports the tweeter 34. The exterior surface of the tweeter 34 comprises a grill 36. In the embodiment as illustrated in FIGS. 3 and 4, the tweeter 34 and its grill 36 are rotatable within shell support member 32 and therefore the direction of the sound emanating from the tweeter 34 through grill 36 can be adjusted relative to the shell support member 32. Referring to FIG. 4, one type of rotation means is to have the tweeter 34 mounted on bearings 38 and 40 which enable the tweeter 34 to rotate within shell support member 32 so that the orientation of the tweeter 34 and its grill 36 can be varied relative to shell support structure 32. Referring to FIG. 3, a second type of rotation means is to have an inner bearing sleeve 42 which causes the tweeter 34 to rotate in a ball and socket type arrangement within inner bearing sleeve 42, with tweeter 34 acting as the ball and inner bearing sleeve 42 acting as the socket.

There are two alternative methods of mounting the tweeter assembly (10 or 30) on the inner portion of the windshield 110. In the preferred embodiment, a post 50 includes a ball 52 mounted in a socket 54 at one end of post 50 and an attaching means 60 which serves to attach the post 50 to the interior of windshield 110. The ball 52 is attached to a stem 56 which in turn is attached to the rear surface 11 of shell support member 12, or attached to the rear surface 31 of shell support member 32. One type of attaching means 60 is a plate 62 which includes a front surface 64 and rear surface 66. The rear surface 66 is attached to the windshield 110 through adhesive means 68. One type of adhesive means 68 is the adhesive which is used to mount the rear view mirror post to the windshield of a vehicle. A stem 70 is attached to the front surface 64 of plate 62. The stem may be directly attached to post 50 or may be attached to a ball 72 which in turn is coupled to a socket 74 at the end of post 50 opposite to the other ball and socket arrangement. This type of mounting arrangement affords the most flexibility in the fixed tweeter embodiment 10. It affords maximum flexibility when used with the movable or rotatable tweeter assembly 30.

Alternatively, as illustrated in FIG. 4, adhesive means 68 can used to mount the rear surface 31 of shell support member 30 directly to the windshield 110. With this direct mounting method, it is substantially preferable to use the movable and rotate tweeter assembly 30 in order to orient the direction of the tweeter 34 and its grill 36 relative to shell support member 32.

With the tweeter assembly (10 or 30) mounted on the windshield, due to the proximity of the mounting relative to the dashboard, it is necessary to orient the tweeter (14 or 34) relative to the shell support member (12 or 32) so that the sound emanating from the tweeter through its grill does not go directly toward the dashboard which reflection of sound will distort it. Instead the tweeter and its grill can be oriented so that the sound is directed into the passenger compartment of the vehicle.

Through use of the preferred mounting arrangement in FIG. 3, the attaching means 60 permits the stem 50 to be oriented in any desired direction and the ball and socket arrangement 52 and 54 further permits the shell support member 32 to be oriented in any desired arrangement relative to the stem 50 and to the windshield 110. This amount of orientation provides enough flexibility to permit use of the fixed tweeter assembly 10. However, for even greater directional flexibility, the movable and rotatable tweeter assembly 30 can be used, as illustrated in FIG. 3.

Through use of the alternative mounting arrangement illustrated in FIG. 4, the movable and rotatable tweeter assembly 30 is preferred because the fixed tweeter assembly 10 would probably result in the sound being directed into the dashboard which would result in reflection of sound off the dashboard 120 and therefore distortion of sound. With the movable and rotatable tweeter assembly 30, the tweeter 34 and its grill 36 can be oriented relative to the fixed shell support member 32 so the sound can be projected into the passenger compartment.

Through any of the arrangements, wires 18 and 20 can be connected to the electronic components of the audio system located beneath the dashboard 120 by drilling a small hole 140 (see FIG. 1) in the dashboard 120 so the wires can be inserted through the hole 140 and connected to the electronic components of the audio system. A similar hole 150 can be drilled in the opposite side of the dashboard for the second tweeter assembly, as illustrated in FIG. 1.

Therefore, the present invention can be defined as a tweeter assembly mounted to the interior of the windshield of a vehicle with a dashboard located adjacent the windshield, the tweeter assembly comprising: (a) a shell support member having a rear surface and an interior chamber for housing a tweeter; (b) a tweeter rotatably mounted within the interior chamber of the shell support member; (c) said tweeter having a covering grill; (d) means for enabling the tweeter and its covering grill to rotate relative to said shell support member; (e) means for mounting the rear surface of said shell support member to the interior of the windshield further comprising, (i) a plate having a rear surface and a front surface, with the rear surface mounted to the interior of the windshield through adhesive means and mounted at a located adjacent the dashboard, (ii) a post attached to the front surface of said plate at one end and having a ball and socket assembly attached to said post at its other end and a stem attached to said ball and socket assembly at one end and attached to the rear surface of said shell support member at its other end; and (f) a pair of wires connecting the tweeter to audio electronic components located beneath the dashboard.

Defined more broadly, the present invention is a tweeter assembly mounted to the interior of the windshield of a vehicle comprising: (a) a shell support member having a rear surface and an interior chamber for housing a tweeter; (b) a tweeter rotatably mounted within the interior chamber of the shell support member; (c) said tweeter having a covering grill; (d) means for enabling the tweeter and its covering grill to rotate relative to said shell support member; (e) means for mounting the rear surface of said shell support member to the interior of the windshield; and (f) means for connecting the tweeter to audio electronic components located within the vehicle.

The means for mounting the rear surface of said shell support member to the interior of the windshield may further comprise: (a) a plate having a rear surface and a front surface, with the rear surface mounted to the interior of the windshield through adhesive means; and (b) a post attached to the front surface of said plate at one end and having a rotation means assembly at its other end which in turn is connected to said shell support member.

The rotation means assembly may further comprise a ball and socket assembly attached to said post, and a stem attached to said ball and socket assembly at one end and attached to the rear surface of said shell support member at its other end.

There may also be a rotation means assembly attaching said post to the front surface of said plate, which rotation means assembly may also be a ball and socket assembly.

The present invention may also be defined as a tweeter assembly mounted to the interior of the windshield of a vehicle comprising: (a) a shell support member having a rear surface and an interior chamber for housing a tweeter; (b) a tweeter mounted within the interior chamber of the shell support member; (c) said tweeter having a covering grill; (d) means for mounting the rear surface of said shell support member to the interior of the windshield; and (e) means for connecting the tweeter to audio electronic components located within the vehicle.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features of principles of the invention or the scope of patent monopoly to be granted.

What is claimed is:

1. A tweeter assembly mounted to the interior of the windshield of a vehicle comprising:
   a. a shell support member having a rear surface and an interior chamber for housing a tweeter;
   b. a tweeter rotatably mounted within the interior chamber of the shell support member;
   c. said tweeter having a covering grill;
   d. means for enabling the tweeter and its covering grill to rotate relative to said shell support member;
   e. means for mounting the rear surface of said shell support member to the interior of the windshield; and
   f. means for connecting the tweeter to audio electronic components located within the vehicle.

2. A tweeter assembly in accordance with claim 1 wherein said means for mounting the rear surface of said shell support member to the interior of the windshield further comprises adhesive means between the rear surface of said shell support member and the interior of the windshield.

3. A tweeter assembly in accordance with claim 1 wherein said means for mounting the rear surface of said shell support member to the interior of the windshield further comprises:
   a. a plate having a rear surface and a front surface, with the rear surface mounted to the interior of the windshield through adhesive means; and
   b. a post attached to the front surface of said plate at one end and having a rotation means assembly at its other end which in turn is connected to said shell support member.

4. A tweeter assembly in accordance with claim 3 wherein said rotation means assembly further comprises a ball and socket assembly attached to said post, and a stem attached to said ball and socket assembly at one end and attached to the rear surface of said shell support member at its other end.

5. A tweeter assembly in accordance with claim 3, further comprising a rotation means assembly attaching said post to the front surface of said plate.

6. A tweeter assembly in accordance with claim 5 wherein said rotation means assembly is a ball and socket assembly.

7. A tweeter assembly in accordance with claim 1 wherein said means for enabling the tweeter and its covering grill to rotate relative to said shell support members are bearings between the tweeter and its grill and the interior of the shell support structure.

8. A tweeter assembly in accordance with claim 1 wherein said means for enabling the tweeter and its covering grill to rotate relative to said shell support member is a ball and socket assembly within the interior chamber of the shell support member.

9. A tweeter assembly in accordance with claim 1 wherein said means for connecting the tweeter to audio electronic components located within the vehicle is a pair of wires connecting the tweeter to the audio electronic components.

10. A tweeter assembly mounted to the interior of the windshield of a vehicle comprising:
   a. a shell support member having a rear surface and an interior chamber for housing a tweeter;
   b. a tweeter mounted within the interior chamber of the shell support member;
   c. said tweeter having a covering grill;
   d. means for mounting the rear surface of said shell support member to the interior of the windshield; and
   e. means for connecting the tweeter to said audio electronic components located within the vehicle, which is a pair of wires connecting the tweeter to the audio electronic components.

11. A tweeter assembly in accordance with claim 10 wherein said means for mounting the rear surface of said shell support member to the interior of the windshield further comprises adhesive means between the rear surface of said shell support member and the interior of the windshield.

12. A tweeter assembly in accordance with claim 10 wherein said means for mounting the rear surface of said shell support member to the interior of the windshield further comprises:
   a. a plate having a rear surface and a front surface, with the rear surface mounted to the interior of the windshield through adhesive means; and
   b. a post attached to the front surface of said plate at one end and having a rotation means assembly at its other end which in turn is connected to said shell support member.

13. A tweeter assembly in accordance with claim 12 wherein said rotation means assembly further comprises a ball and socket assembly attached to said post, and a stem attached to said ball and socket assembly at one end and attached to the rear surface of said shell support member at its other end.

14. A tweeter assembly in accordance with claim 12 further comprising a rotation means assembly attaching said post to the front surface of said plate.

15. A tweeter assembly in accordance with claim 14 wherein said rotation means assembly is a ball and socket assembly.

16. A tweeter assembly mounted to the interior of the windshield of a vehicle with a dashboard located adjacent the windshield, the tweeter assembly comprising:
   a. a shell support member having a rear surface and an interior chamber for housing a tweeter;
   b. a tweeter rotatably mounted within the interior chamber of the shell support member;
   c. said tweeter having a covering grill;
   d. means for enabling the tweeter and its covering grill to rotate relative to said shell support member;
   e. means for mounting the rear surface of said shell support member to the interior of the windshield further comprising,
      (i) a plate having a rear surface and a front surface, with the rear surface mounted to the interior of the windshield through adhesive means and mounted at a located adjacent the dashboard,
      (ii) a post attached to the front surface of said plate at one end and having a ball and socket assembly attached to said post at its other end and a stem attached to said ball and socket assembly at one end and attached to the rear surface of said shell support member at its other end; and
   f. a pair of wires connecting the tweeter to audio electronic components located beneath the dashboard.

17. A tweeter assembly in accordance with claim 16 further comprising a ball and socket assembly attaching said post to the front surface of said plate.

18. A tweeter assembly in accordance with claim 16 wherein said means for enabling the tweeter and its covering grill to rotate relative to said shell support members are bearings between the tweeter and its grill and the interior of the shell support structure.

19. A tweeter assembly in accordance with claim 16 wherein said means for enabling the tweeter and its covering grill to rotate relative to said shell support member is a ball and socket assembly within the interior chamber of the shell support member.

* * * * *